(12) United States Patent
Kadosh et al.

(10) Patent No.: US 10,469,656 B2
(45) Date of Patent: *Nov. 5, 2019

(54) VOICE OVER INTERNET PROTOCOL RELAY INTEGRATION FOR FIELD SERVICE MANAGEMENT

(71) Applicant: WORKIZ, INC., San Diego, CA (US)

(72) Inventors: Idan Kadosh, San Diego, CA (US); Erez Marom, San Diego, CA (US)

(73) Assignee: WORKIZ, INC., San Diego, CA (US)

( * ) Notice: Subject to any disclaimer, the term of this patent is extended or adjusted under 35 U.S.C. 154(b) by 415 days.

This patent is subject to a terminal disclaimer.

(21) Appl. No.: 15/357,870

(22) Filed: Nov. 21, 2016

(65) Prior Publication Data

US 2017/0070607 A1 Mar. 9, 2017

Related U.S. Application Data

(63) Continuation of application No. 14/565,273, filed on Dec. 9, 2014, now Pat. No. 9,501,752.

(60) Provisional application No. 62/010,759, filed on Jun. 11, 2014.

(51) Int. Cl.
| | |
|---|---|
| *H04M 3/42* | (2006.01) |
| *H04M 7/00* | (2006.01) |
| *H04M 3/22* | (2006.01) |
| *H04M 15/00* | (2006.01) |
| *G06Q 10/06* | (2012.01) |
| *G06Q 10/10* | (2012.01) |

(52) U.S. Cl.
CPC .. *H04M 3/42008* (2013.01); *G06Q 10/06311* (2013.01); *G06Q 10/1097* (2013.01); *H04M 7/006* (2013.01); *H04M 2203/256* (2013.01); *H04M 2203/301* (2013.01); *H04M 2203/551* (2013.01); *H04M 2203/558* (2013.01)

(58) Field of Classification Search
CPC ............. H04M 3/42008; H04M 7/006; H04M 3/2281; H04M 3/229; H04M 15/771; H04M 15/773; G06Q 10/06311; G06Q 10/1097
USPC ........................................................ 705/7.13
See application file for complete search history.

(56) References Cited

U.S. PATENT DOCUMENTS

| | | | | |
|---|---|---|---|---|
| 5,615,121 | A * | 3/1997 | Babayev | G06Q 10/06 705/7.22 |
| 7,069,333 | B1 * | 6/2006 | Morris | G06Q 10/06 709/232 |
| 8,355,362 | B2 | 1/2013 | Ryu | |
| 9,501,752 | B2 * | 11/2016 | Kadosh | G06Q 10/06311 |

(Continued)

*Primary Examiner* — Dylan C White
(74) *Attorney, Agent, or Firm* — Arc IP Law, PC; Joseph J. Mayo

(57) ABSTRACT

A VoIP relay integration management system including a service management application and a VoIP phone server that monitor and gather client interaction data between a client and a field agent. The system accepts a selection of service phone method, from a plurality of selection methods, for the field agent to use to call the client, and enables or disables the selection per the field agent. The system accepts, stores and schedules a task to be dispatched to the field agent, and calculates and displays a response time that includes a time from when the task is dispatched to the field agent to when the field agent generates a call. The system calculates and displays an average response time of all calls generated by the field agent, based on one or more of the field agent, an area of the task, a date of the task and a type of task.

14 Claims, 9 Drawing Sheets

(56) References Cited

U.S. PATENT DOCUMENTS

| | | | |
|---|---|---|---|
| 2001/0026545 A1* | 10/2001 | Matsumoto | H04Q 3/62 370/338 |
| 2004/0098400 A1 | 5/2004 | Landau et al. | |
| 2004/0100650 A1 | 5/2004 | Landau et al. | |
| 2007/0150480 A1* | 6/2007 | Hwang | G06Q 10/00 |
| 2007/0242809 A1* | 10/2007 | Mousseau | H04M 7/0036 379/88.18 |
| 2008/0172278 A1 | 7/2008 | Hanizeski et al. | |
| 2009/0048853 A1* | 2/2009 | Hall | G06Q 10/06 705/305 |
| 2009/0181642 A1* | 7/2009 | Bekanich | G06Q 10/109 455/406 |
| 2009/0319572 A1* | 12/2009 | Bernard | G06Q 10/06 |
| 2010/0312605 A1 | 12/2010 | Mitchell et al. | |
| 2011/0025847 A1* | 2/2011 | Park | G06Q 10/06 348/143 |
| 2011/0167006 A1 | 7/2011 | Mangalore et al. | |
| 2012/0166243 A1* | 6/2012 | Belmont | G06Q 10/06311 705/7.13 |
| 2012/0286595 A1 | 11/2012 | Pal | |
| 2014/0052644 A1* | 2/2014 | Ott | G06Q 10/10 705/304 |
| 2017/0295281 A1* | 10/2017 | Lasso | H04M 7/006 |

\* cited by examiner

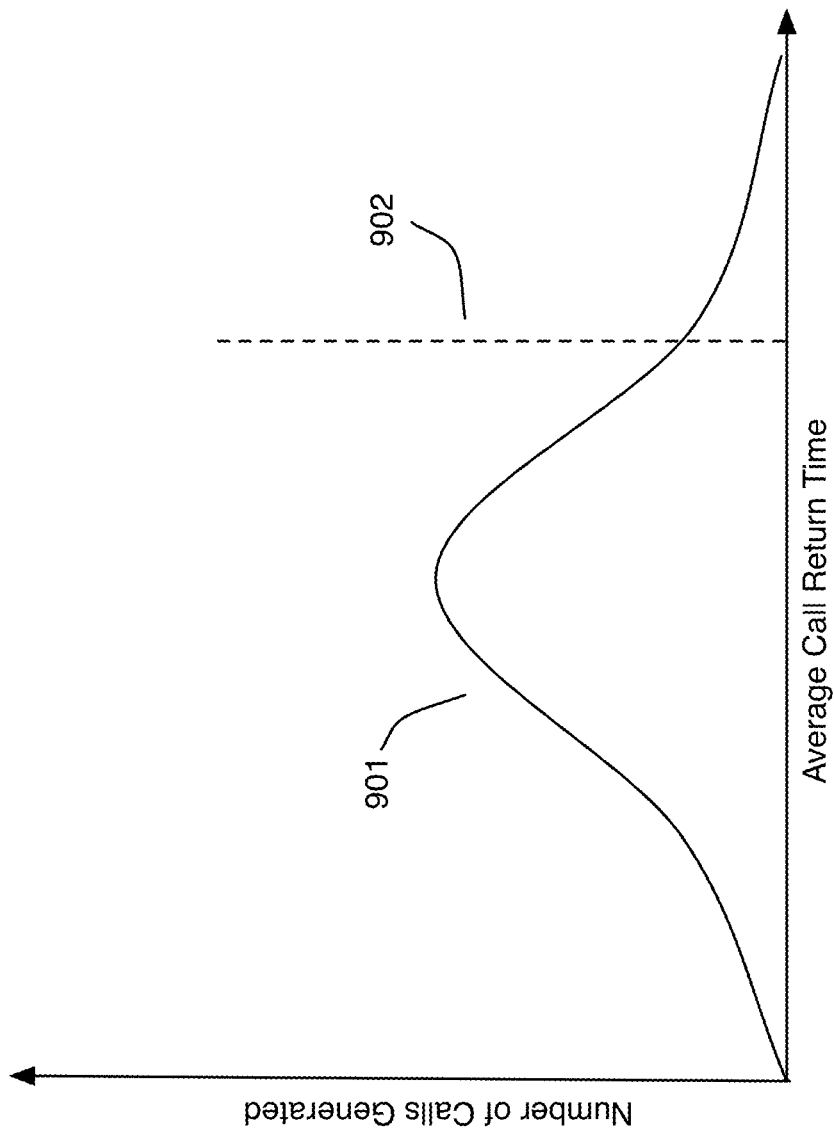

VOICE OVER INTERNET PROTOCOL RELAY INTEGRATION FOR FIELD SERVICE MANAGEMENT

This patent application is a continuation of U.S. patent application Ser. No. 14/565,273, filed 9 Dec. 2014, which claims the benefit of U.S. Provisional Patent Application Ser. No. 62/010,759 filed 11 Jun. 2014, the specifications of which are hereby incorporated herein by reference.

BACKGROUND OF THE INVENTION

Field of the Invention

Embodiments of the invention generally relate to voice over Internet Protocol (VoIP) relay integration systems, and more particularly to a VoIP relay integration management system with a service management application to manage field service.

Description of the Related Art

Generally, scheduling and dispatching tasks to field agents enable companies to manage and control service requirements from clients. Field agents may perform services such as, but not limited to, locksmith services, plumbing services, HVAC services, electrical services, installation services, etc. Scheduling and dispatching systems are typically used to inform field agents of the dates and times of such outstanding services.

Typically, service companies use computer systems to dispatch services and client information to field agents, such as the type of service required, the client's name, the client's address where the service is needed, and the client's phone number. Generally, field agents receive the dispatched job and time frame, and directly contact the client prior to the scheduled service, based on the relative field location of where the service is to be performed. For example, companies may use automatic scheduling software to facilitate communication between a field agent and a client.

Efficient field service management generally relies on well-organized scheduling and constant estimation of a duration of a task to be completed. Lack of efficient workforce and field service management may result in higher costs, undesirable errors, underestimated time to complete a task, non-productive workforce, poor customer service, and therefrom customer dissatisfaction. Generally, field service management technologies have been developed to help companies efficiently schedule and dispatch tasks to field agents, however such technologies require the distribution of client information to field agents, with minimal control and management of the amount of time taken to complete tasks performed by field agents. Some field agents have been known to contact clients and offer lower prices to undercut the company that assigned the client to the field service technician. Other field agents have been known to respond in a time frame that is long enough that the client has chosen another company to perform the service.

For example, United States Publication 20090048853, entitled "Permission Based Field Service Management System", to Hall, discloses a field service management system and method for field services using a permission slip, wherein a technician is given a specific work list to performed a field service as authenticated by a software system. According to Hall, a technician may accept the work list, wherein after a task is completed, the permission slip is closed and a service log is stored on a server database. The system of Hall, however, fails to disclose a VoIP relay integration system to accurately and efficiently dispatch tasks to field agents, monitor the duration of time to complete such tasks, and track field agent consistency and timeliness in completing such tasks, while ensuring client information remains private.

United States Patent Publication 20090181642, entitled "Professional Services Time Capturing System", to Bekanich, appears to disclose a system and method for capturing professional billing services and other information related to a communication event. According to Bekanich, the capture information includes the client's name, telephone number, email address, event start time, event end time, event billable time, amount charged for the event, billing rate, and notes/activities associated with the event. The system of Bekanich, however, fails to disclose a VoIP relay integration system to accurately and efficiently dispatch tasks to field agents, monitor the duration of time to complete such tasks, and track field agent consistency and timeliness in completing such tasks, while ensuring client information remains private.

For example, United States Patent Publication 20100312605, entitled "Technician Control System", to Mitchell et al., discloses a control system to control scheduling and dispatch operations for work orders being handled by technicians. According to Mitchell et al., a set of scheduling configuration options and user-input weightings data may be pre-defined and used with a scheduling application to perform scheduling operations based on the configuration operations and data received. The system of Mitchell et al., however, fails to disclose a VoIP relay integration system to accurately and efficiently dispatch tasks to field agents, monitor the duration of time to complete such tasks, and track field agent consistency and timeliness in completing such tasks, while ensuring client information remains private.

In view of the above, there is a need for an improved VoIP relay integration system for field service management to efficiently schedule and dispatch tasks to field agents, monitor the duration of time to complete such tasks, and track field agent consistency and timeliness in completing such tasks, while ensuring client information remains private.

BRIEF SUMMARY OF THE INVENTION

One or more embodiments of the invention provide a voice over Internet Protocol (VoIP) relay integration management system that includes a service management application that is executed on a computer and a VoIP phone server.

In at least one embodiment of the invention, the service management application includes an application database, a field management setup screen, a task management screen and a call reporting screen. In one or more embodiments, the service management application is accessible by at least one authorized account user. In at least one embodiment, the service management application monitors and gathers data of at least one client, wherein the data includes client interaction data between the at least one client and at least one field agent.

In one or more embodiments of the invention, the VoIP phone server communicates with the service management application via a network, and includes a phone service database. In at least one embodiment, the phone service database includes a plurality of service phone numbers.

By way of one or more embodiments, via the field management setup screen, the service management application may accept credentials from the at least one authorized account user, validate the credentials to authenticate ownership, accept a selection of a method for service phones from the at least one authorized account user from a plurality of selection methods, and enable or disable the selection per the at least one field agent. In at least one embodiment, the plurality of selection methods may include one or more of a first selection method, a second selection method and a third selection method. In one or more embodiments, the first selection method includes selecting a single phone number with a temporary extension number from the plurality of service phone numbers. In one or more embodiments, the second selection method includes selecting multiple phone numbers, from a pool, from the plurality of service phone numbers. In at least one embodiment, the third selection method includes selecting at least one phone number assigned with a caller identification from the plurality of service phone numbers. By way of at least one embodiment, the single phone number, the multiple phone numbers and the at least one number assigned with a caller identification are assigned to and used by the at least one field agent to call the at least one client.

According to one or more embodiments, via the task management screen, the service management application may accept, store and schedule at least one task to be dispatched to the at least one field agent. In at least one embodiment of the invention, the at least one task may include one or more of a job identification, a project, and a name, an address and a contact phone number associated with the at least one client.

In one or more embodiments of the invention, via the task management screen, the service management application may accept, log and store information associated with one or more calls generated by the at least one field agent relevant to the at least one task. In at least one embodiment, the information may include one or more of a duration of the one or more calls and a time of the one or more calls. In one or more embodiments, via the task management screen, the service management application may one or more of display an option to record and save the one or more calls as one or more recordings, display an option to play the one or more recordings, display an option to send the one or more recordings, and calculate and display a response time and an average response time. In at least one embodiment, the response time includes a time from when the at least one task is dispatched to the at least one field agent to when the one or more calls were generated by the field agent.

By way of at least one embodiment, the service management application may calculate an average response time of the response time of all of the one or more calls generated by the at least one field agent. In one or more embodiments, the average response time is calculated based on one or more of the at least one field agent, an area of the at least one task, a date of the at least one task and a type of task of the at least one task.

In at least one embodiment of the invention, via the call reporting screen, the service management application may accept a selected time frame and display the one or more calls conducted within the selected time frame. In one or more embodiments, via the call reporting screen, the service management application may filter the one or more calls based one or more of the job identification, the client name, a number of calls conducted, a first call conducted, the at least one field agent, a status of the at least one task or of the job identification and the response time. In at least one embodiment, via the call reporting screen, the service management application may provide a call report on each of the at least one task. In one or more embodiments, the call report may include one or more of the duration of the one or more calls, the time of the one or more calls, the one or more recordings saved and the one or more recordings sent. In at least one embodiment, via the call reporting screen, the service management application may provide and display an average response time of the response time of all of the one or more calls. In at least one embodiment, the average response time may be displayed based on one or more of the at least one field agent, an area of the at least one task, a date of the at least one task and a type of task of the at least one task.

According to one or more embodiments, when the first selection is enabled, the service management application may generate a temporary extension number associated with the at least one task and may assign the temporary extension number to the at least one client. In at least one embodiment of the invention, the VoIP phone server is synced with the temporary extension number, such that when the field agent calls the at least one client, the temporary extension number is used to forward calls from the at least one field agent to the contact phone number associated with the at least one client. In at least one embodiment, when the first selection is enabled, the service management application may dispatch the at least one task to the at least one field agent to enable the at least one field agent to call the at least one client associated with the at least one task. In one or more embodiments, the at least one field agent does not receive the contact phone number associated with the at least one client and only receives the assigned temporary extension number and the selected single phone number from the plurality of service phone numbers.

By way of at least one embodiment, when the at least one field agent calls the at least one client via the single phone number, after the first selection is enabled, the VoIP server prompts the at least one field agent to enter the temporary extension number. Therefrom, in one or more embodiments, the service management application validates the temporary extension number with the single phone number. When the temporary extension number is validated, in at least one embodiment, the VoIP phone server may forward the call to the contact phone number associated with the at least one client, and, when the call is forwarded to the contact phone number associated with the at least one client, the service management application may one or more of record and store the call, and log the information associated with the call. In at least one embodiment, when the call is forwarded to the contact phone number associated with the at least one client, the VoIP phone server may record and store the call in the phone service database, may log the information associated with the call in the phone service database, or may record, store and log the call in the phone service database.

According to one or more embodiments, when the second selection is enabled, the service management application may assign an available phone number from the multiple phone numbers to the at least one task. In at least one embodiment, the VoIP phone server may be synced with the assigned available phone number, such that the assigned available phone number may be used to route calls from the at least one field agent to the contact phone number associated with the at least one client. In at least one embodiment, when the second selection is enabled, the service management application may dispatch the at least one task to the at least one field agent to enable the at least one field agent to call the at least one client associated with the at least one task. In one or more embodiment, when the second selection is enabled, the at least one field agent does not receive the contact phone number associated with the at least one client and only receives the assigned available phone number from the multiple phone numbers from the plurality of service phone numbers.

In at least one embodiment of the invention, when the at least one field agent calls the at least one client via the assigned available phone number, the VoIP phone server may forward the call to the contact phone number associated with the at least one client. In one or more embodiments, when the call is forwarded to the contact phone number associated with the at least one client, the service management application may one or more of record and store the call, and log the information associated with the call. In at least one embodiment, when the call is forwarded to the contact phone number associated with the at least one client, the VoIP phone server may one or more of record and store the call in the phone service database, and log the information associated with the call in the phone service database.

By way of at least one embodiment, when the third selection is enabled, the service management application may assign phone numbers with caller identifications from the at least one phone number assigned with a caller identification to each of the at least one task associated with the at least one client. In one or more embodiments, when the third selection is enabled, the service management application may save the phone numbers assigned with caller identifications in the application database, and may identify which phone number assigned with the caller identification from the saved phone numbers the at least one client will use to receive a call from the at least one field agent, and enables the at least one client to call the at least one agent via the identified phone number.

In at least one embodiment of the invention, when the third selection is enabled, the service management application may dispatch the at least one task to the at least one field agent to enable the at least one field agent to call the at least one client associated with the at least one task. In one or more embodiment, when the third selection is enabled, the service management application may communicate the identified phone number with the caller identification from the saved phone numbers to the at least one field agent, indicating a number the at least one field agent will be making one or more calls with to the at least one client. In at least one embodiment, the at least one field agent does not receive the contact phone number associated with the at least one client and only receives the assigned phone number selected from the saved phone numbers assigned with caller identifications.

In one or more embodiments of the invention, when the at least one field agent calls the at least one client via the assigned phone number selected from the saved phone numbers assigned with caller identifications, the service management application may identify the phone number used by the at least one field, may cross-references the phone number used by the at least one field agent with the phone numbers saved in the application database, and may find a match between the phone number used by the at least one field agent and the phone numbers saved in the application database. In at least one embodiment of the invention, when the at least one field agent calls the at least one client via the assigned phone number selected from the saved phone numbers assigned with caller identifications, the service management application may identify the at least one task assigned to the at least one agent with the phone number and may integrate the VoIP phone server, such that the VoIP phone server forwards the call to the contact phone number associated with the at least one client.

In at least one embodiment, when the at least one field agent calls the at least one client via the assigned phone number selected from the saved phone numbers assigned with caller identifications, and when the call is forwarded to the contact phone number associated with the at least one client, the service management application may one or more of record the call, store the call, and log the information associated with the call, and. In one or more embodiments, when the at least one field agent calls the at least one client via the assigned phone number selected from the saved phone numbers assigned with caller identifications, and when the call is forwarded to the contact phone number associated with the at least one client, the VoIP phone server may one or more of record the call in the phone service database, store the call in the phone service database, and log the information associated with the call in the phone service database.

According to one or more embodiments of the invention, when the call is forwarded to the contact phone number associated with the at least one client, the at least one client may receive information about the at least one field agent. In at least one embodiment, the information may include one or more of a name associated with the at least one field agent, an identification number associated with the at least one field agent, an office number associated with the at least one field agent, and a geographical location associated with the at least one field agent.

BRIEF DESCRIPTION OF THE DRAWINGS

The above and other aspects, features and advantages of at least one embodiment of the invention will be more apparent from the following more particular description thereof, presented in conjunction with the following drawings, wherein:

FIG. 4 is an exemplary interface of the field management application setup screen;

FIG. 6 is an exemplary interface of the field management application task management screen;

FIG. 8 is an exemplary interface of the field management application call reporting screen; and, FIG. 9 is an exemplary graph depicting the average call return time from calls generated by a field agent to a client.

DETAILED DESCRIPTION OF THE INVENTION

The following description is of the best mode presently contemplated for carrying out at least one embodiment of the invention. This description is not to be taken in a limiting sense, but is made merely for the purpose of describing the general principles of the invention. The scope of the invention should be determined with reference to the claims.

Figure 1:
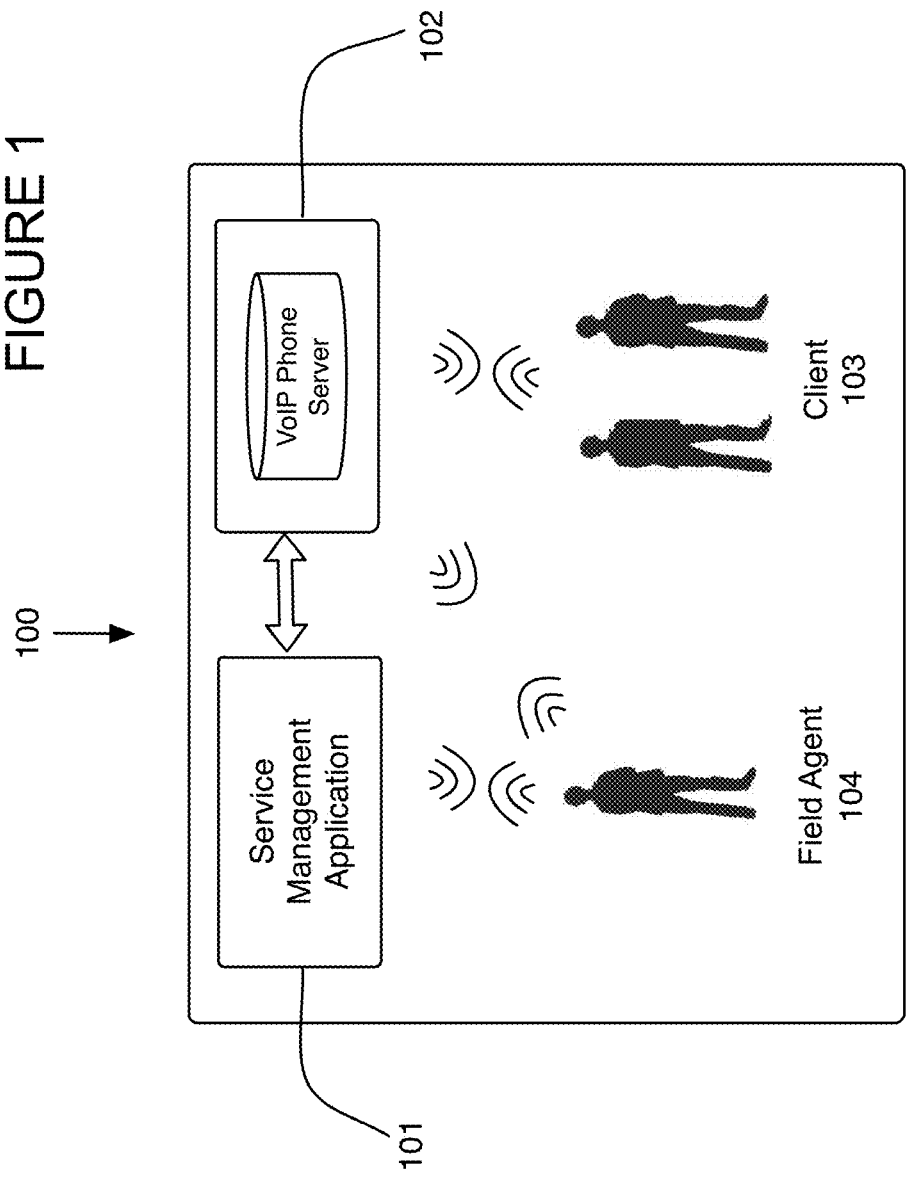
FIG. 1 is an overall illustration of the VoIP relay integration management system.

FIG. 1 is an overall illustration of the VoIP relay integration management system, according to one or more embodiments of the invention. As shown in FIG. 1, one or more embodiments of the invention provide a voice over Internet Protocol (VoIP) relay integration management system 100 that includes a service management application 101 that is executed on a computer, and also includes a VoIP phone server 102. In at least one embodiment, the computer may include any portable, wireless or mobile computer system with a screen.

In at least one embodiment of the invention, the service management application 101 includes an application database, a field management setup screen, a task management screen and a call reporting screen. In one or more embodiments, the service management application 101 is accessible by at least one authorized account user. In at least one embodiment, the service management application 101 monitors and gathers data of at least one client 103, wherein the data includes client interaction data between at least one client 103 and at least one field agent 104.

In one or more embodiments of the invention, the VoIP phone server 102 communicates with the service management application 101 via a network, such as a wireless network or a cloud based system, and includes a phone service database. In at least one embodiment, the phone service database includes a plurality of service phone numbers. By way of at least one embodiment, each of the VoIP phone sever 102, the service management application 101, the at least one client 103 and the at least one field agent 104 may communicate with one another in a wired or wireless manner, such as over a network, using mobile phones, or any other computer.

Figure 2:
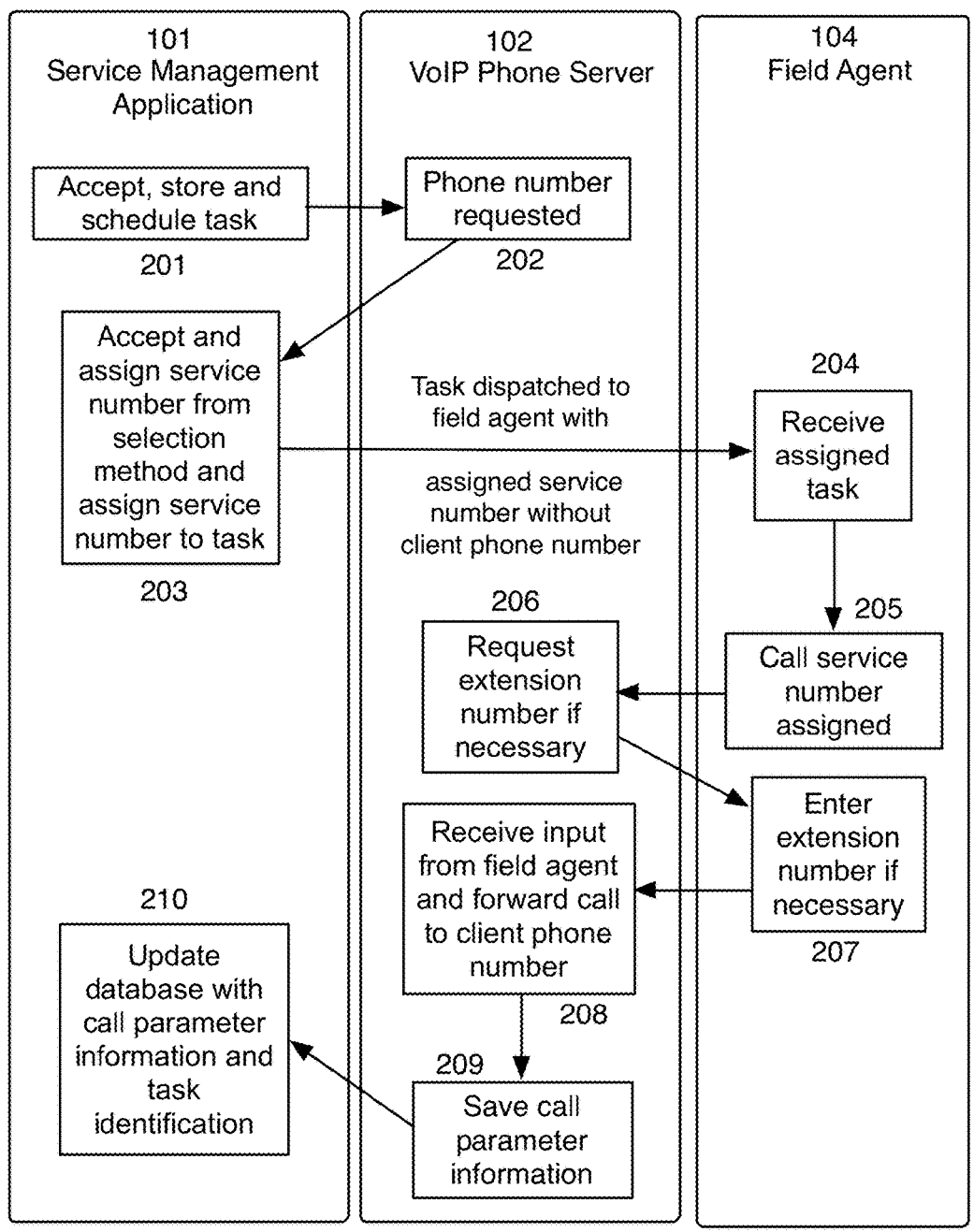
FIG. 2 is an exemplary flow chart of using the VoIP relay integration management system.

FIG. 2 is an exemplary flow chart of using the VoIP relay integration management system 100, according to one or more embodiments of the invention. By way of one or more embodiments, via the field management setup screen, the service management application 101 may accept credentials from the at least one authorized account user and validate the credentials to authenticate ownership, at 201. In at least one embodiment, the service management application 101 may request a phone number from the plurality of service phone numbers from the VoIP phone server 102, at 202. In one or more embodiments, the service management application 101 may accept a selection of a method for service phones from the at least one authorized account user from a plurality of selection methods, and enable or disable the selection per the at least one field agent 104, at 203, after receiving the requested service phone number. In at least one embodiment, the plurality of selection methods may include one or more of a first selection method, a second selection method and a third selection method.

In one or more embodiments, the first selection method includes selecting a single phone number with a temporary extension number from the plurality of service phone numbers, as requested from the VoIP phone server 102. In one or more embodiments, the second selection method includes selecting multiple phone numbers, from a pool, from the plurality of service phone numbers, as requested from the VoIP phone server 102. In at least one embodiment, the third selection method includes selecting at least one phone number assigned with a caller identification from the plurality of service phone numbers, as requested from the VoIP phone server 102. By way of at least one embodiment, the single phone number, the multiple phone numbers and the at least one number assigned with a caller identification are assigned to and used by the at least one field agent 104 to call the at least one client 103, as will be discussed further below.

According to one or more embodiments, via the task management screen, the service management application 101 may accept, store and schedule at least one task, at 201, to be dispatched to the at least one field agent 104. In at least one embodiment of the invention, the at least one task may include one or more of a job identification, a project, and a name, an address and a contact phone number associated with the at least one client 103. In at least one embodiment of the invention, after a selection method is enabled and a phone number is requested, the service management application 101 may accept and assigned a service number from the selection method and assigned the service number to at least one scheduled task, at 203. In one or more embodiments, once the requested and received service number is assigned to at least one scheduled task at 203, the service management application 101 may dispatch the at least one scheduled task to the at least one field agent 104, along with the assigned service number, and without the contact phone number associated with the at least one client 103. By way of at least one embodiment, the at least one field agent 104 receives the assigned task, at 204. In at least one embodiment of the invention, the at least one agent 104 may receive notice of the dispatched task via one or more of a short message service (SMS) text, a phone call, an e-mail and a daily agent of appointments synced with the service management application 101. In one or embodiments, once the at least one field agent 104 receives the dispatched assigned task, the at least one field agent 104 may call the assigned service phone number at 205 to reach the at least one client 103, for example through the VoIP phone server 102 as opposed to directly contacting client 103.

According to one or more embodiments, when the first selection is enabled, the service management application 101 may generate a temporary extension number associated with the at least one task and may assign the temporary extension number to the at least one client 103. In at least one embodiment of the invention, the VoIP phone server 102 is synced with the temporary extension number, such that when the at least one field agent 104 calls the at least one client 103 via the assigned service number at 205, the temporary extension number is used to forward calls from the at least one field agent 104 to the contact phone number associated with the at least one client 103. In at least one embodiment, when the first selection is enabled, the service management application 101 may dispatch the at least one task to the at least one field agent 104 to enable the at least one field agent 104 to call the at least one client 103 associated with the at least one task, for example indirectly, via the assigned service phone number, at 205. In one or more embodiments, the at least one field agent 104 does not receive the contact phone number associated with the at least one client 103 and only receives the assigned temporary extension number and the selected assigned single service phone number from the plurality of service phone numbers.

By way of at least one embodiment, when the at least one field agent 104 calls the at least one client 103 via the single phone number, at 205, after the first selection is enabled, the VoIP phone server 102 prompts, at 206, the at least one field agent 104 to enter the temporary extension number, at 207. Therefrom, in one or more embodiments, the service management application 101 and/or the VoIP phone server 102 may receive input of the temporary extension number from the at least one field agent 104 and validates the temporary extension number with the single assigned service phone number, at 208. When the temporary extension number is validated, in at least one embodiment, the VoIP phone server 102 may forward the call to the contact phone number associated with the at least one client 103, at 208. In at least one embodiment, when the call is forwarded to the contact phone number associated with the at least one client 103, the VoIP phone server 102 may record and store the call in the phone service database, may save call parameter information, may log the information associated with the call in the phone service database, or may record, store and log the call in the phone service database, at 209. In one or more embodiments, when the call is forwarded to the contact phone number associated with the at least one client 103, the service management application 101 may one or more of record and store the call, save call parameter information, and log the information associated with the call at 210. In at least one embodiment, the service management application 101 may receive data from the VoIP phone server 102, including the call parameter information and all information associated with the call, and may update the service management application database with the received and stored information, and link the information to the at least one scheduled task within the application database.

According to one or more embodiments, when the second selection is enabled, the service management application 101 may assign an available phone number from the multiple phone numbers to the at least one task, at 203, after requesting a service phone number from the VoIP phone server 102, at 202. In at least one embodiment, the VoIP phone server 102 may be synced with the assigned available phone number, such that the assigned available phone number may be used to route calls from the at least one field agent 104 to the contact phone number associated with the at least one client 103. In at least one embodiment, when the second selection is enabled, the service management application 101 may dispatch the at least one task to the at least one field agent 104, wherein the field agent 104 receives the at least one task, at 204, to enable the at least one field agent 104 to call the at least one client 103 associated with the at least one task via the assigned available phone number, at 205. In one or more embodiments, when the second selection is enabled, the at least one field agent 104 does not receive the contact phone number associated with the at least one client 103 and only receives the assigned available phone number from the multiple phone numbers from the plurality of service phone numbers.

In at least one embodiment of the invention, when the at least one field agent 104 calls the at least one client 103 via the assigned available phone number, at 205, after the second selection is enabled, the VoIP phone server 102 may forward the call to the contact phone number associated with the at least one client 103, at 208, without the need to request and accept a temporary extension number.

In at least one embodiment, during the second selection method, when the call is forwarded to the contact phone number associated with the at least one client 103, the VoIP phone server 102 may record and store the call in the phone service database, may save call parameter information, may log the information associated with the call in the phone service database, or may record, store and log the call in the phone service database, at 209. In one or more embodiments, when the call is forwarded to the contact phone number associated with the at least one client 103, the service management application 101 may one or more of record and store the call, save call parameter information, and log the information associated with the call at 210. In at least one embodiment, the service management application 101 may receive data from the VoIP phone server 102, including the call parameter information and all information associated with the call, and may update the service management application database with the received and stored information, and link the information to the at least one scheduled task within the application database.

By way of at least one embodiment, when the third selection is enabled, the service management application 101 may assign phone numbers with caller identifications from the at least one phone number assigned with a caller identification to each of the at least one task associated with the at least one client 103, at 203. In one or more embodiments, when the third selection is enabled, the service management application 101 may save the phone numbers assigned with caller identifications in the application database, after requesting the phone numbers assigned with call identifications from the VoIP phone server 102, at 202, and may identify which phone number assigned with the caller identification from the saved phone numbers the at least one client 103 will use to receive a call from the at least one field agent 104, and enables the at least one client 103 to call the at least one agent 104 via the identified phone number.

In at least one embodiment of the invention, when the third selection is enabled, the service management application 101 may dispatch the at least one task to the at least one field agent 104, wherein the at least one field agent 104 receives the at least one task at 204, to enable the at least one field agent 104 to call the at least one client 103 associated with the at least one task, at 205, via the identified phone number assigned with the caller identification. In one or more embodiments, when the third selection is enabled, the service management application 101 may communicate the identified phone number with the caller identification from the saved phone numbers to the at least one field agent 104, indicating a number the at least one field agent 104 will be making one or more calls with to the at least one client 103, at 205. In at least one embodiment, the at least one field agent 104 does not receive the contact phone number associated with the at least one client 103 and only receives the assigned phone number selected from the saved phone numbers assigned with caller identifications.

In one or more embodiments of the invention, when the at least one field agent 104 calls the at least one client 103 via the identified and assigned phone number selected from the saved phone numbers assigned with caller identifications, at 205, the service management application 101 may identify the phone number used by the at least one field, may cross-reference the phone number used by the at least one field agent 104 with the phone numbers saved in the application database, and may find a match between the phone number used by the at least one field agent 104 and the phone numbers saved in the application database. In at least one embodiment of the invention, when the at least one field agent 104 calls the at least one client 103 via the assigned phone number selected from the saved phone numbers assigned with caller identifications, at 205, the service management application 101 may identify the at least one task assigned to the at least one agent 104 with the phone number and may integrate the VoIP phone server 102, such that the VoIP phone server 102 forwards the call to the contact phone number associated with the at least one client 103, at 208.

In at least one embodiment, when the at least one field agent 104 calls the at least one client 103 via the assigned phone number selected from the saved phone numbers assigned with caller identifications, at 205, and when the call is forwarded to the contact phone number associated with the at least one client 103, at 208, the service management application 101 may one or more of record the call, save call parameter information, store the call, and log the information associated with the call, at 210. In one or more embodiments, when the at least one field agent 104 calls the at least one client 103 via the assigned phone number selected from the saved phone numbers assigned with caller identifications, and when the call is forwarded to the contact phone number associated with the at least one client 103, the VoIP phone server 102 may one or more of record the call in the phone service database, save the call parameter information, store the call in the phone service database, and log the information associated with the call in the phone service database, at 209. In at least one embodiment, the service management application 101 may receive data from the VoIP phone server 102, including the call parameter information and all information and data associated with the call, and may update the service management application database with the received and stored information, and link the information to the at least one scheduled task within the application database, at 210.

In one or more embodiments of the invention, from the plurality of selection methods, the information associated with the call may be directly received by the VoIP phone server 102, or may be directly received by the service management application 101, wherein at least part of, or all of, the information and data may be exchanged between the VoIP phone server 102 and the service management application 101. In at least one embodiment, the information may be directly received by both the VoIP phone server 102 and the service management application 101 from the at least one field agent 104.

Figure 3:
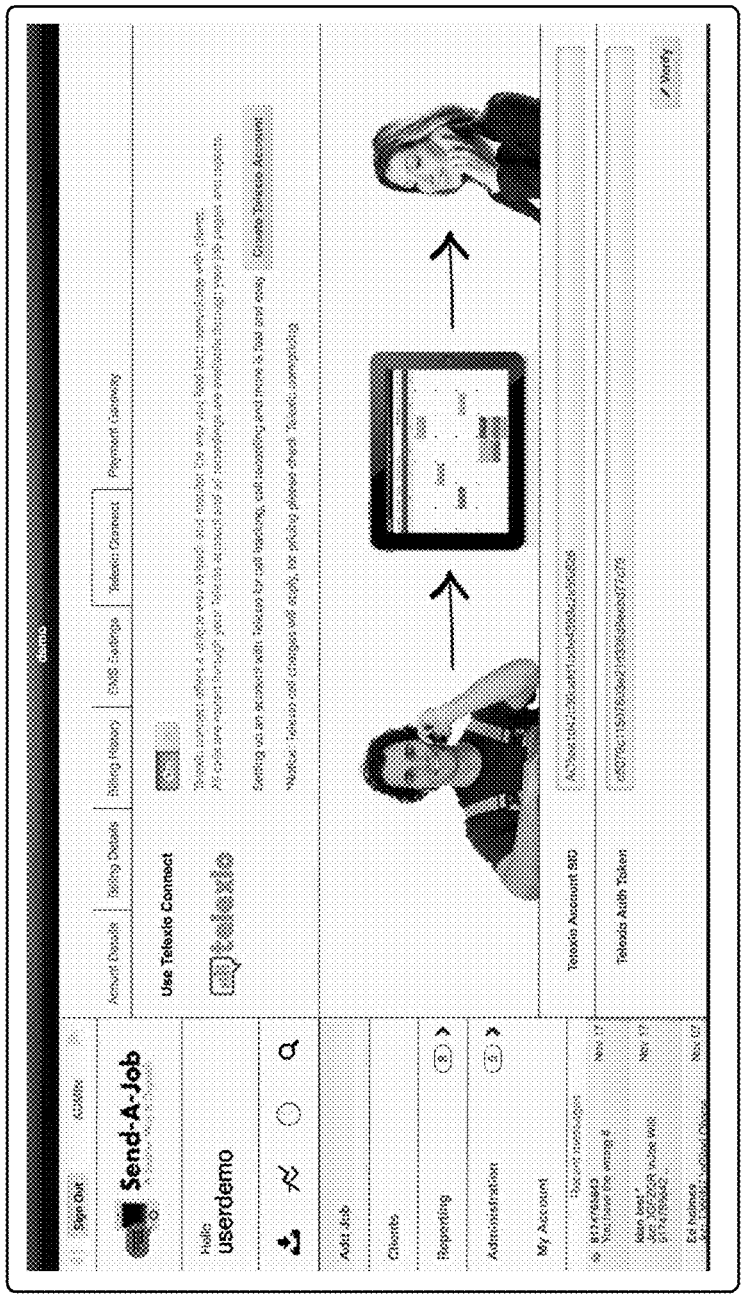
FIG. 3 is an exemplary interface of the field management application setup screen.
Figure 4:
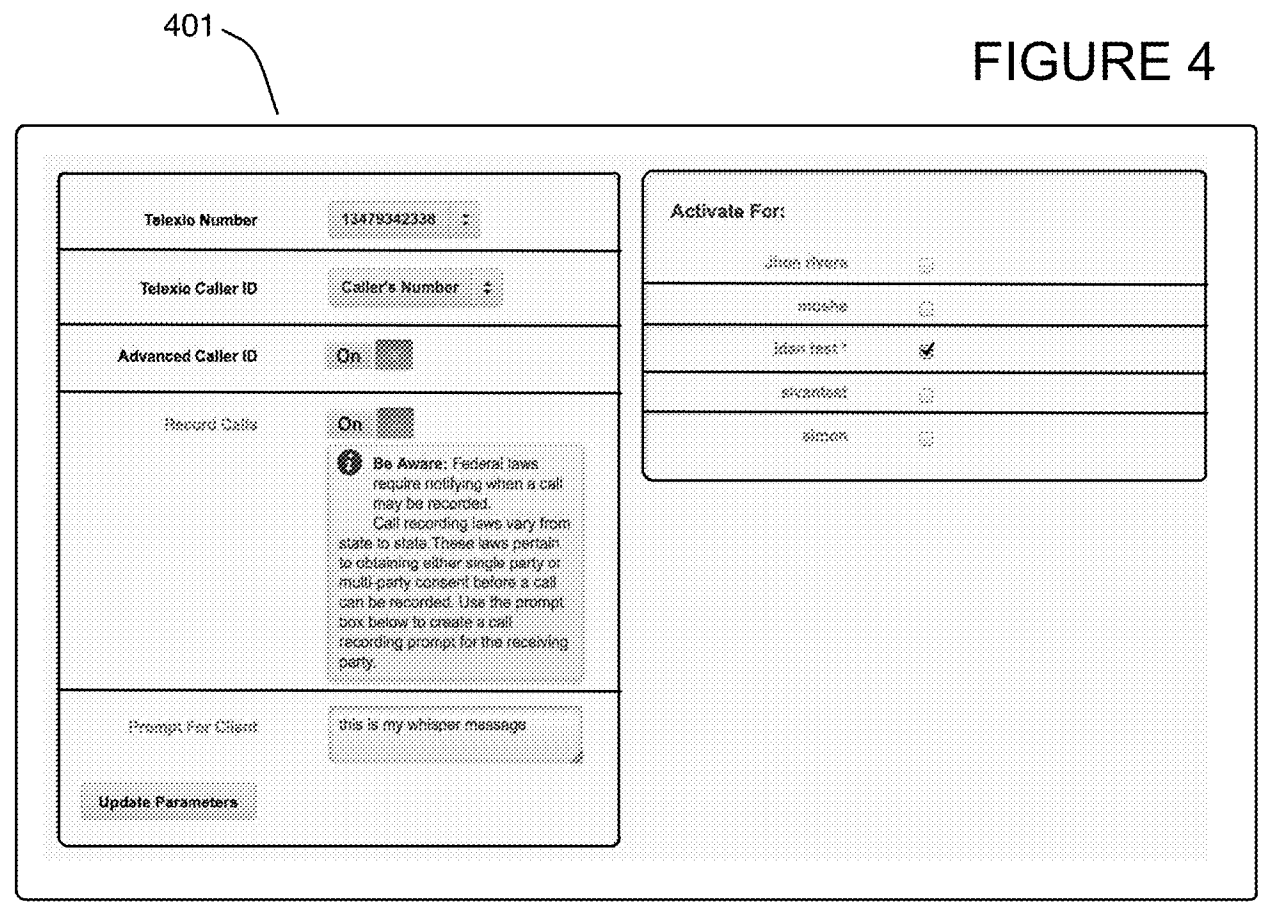
Figure 5:
FIG. 5 is an exemplary interface of the field management application setup screen.

FIG. 3, FIG. 4 and FIG. 5 are exemplary interfaces of the field management application setup screen, according to one or more embodiments of the invention. As shown in FIG. 3, by way of one or more embodiments, via the field management setup screen 301, the service management application 101 may accept credentials from the at least one authorized account user and validate the credentials to authenticate ownership, using an account identification entry and an authorization token entry. In one or more embodiments, the account identification entry and the authorization token entry may include one or more of numbers and letters. In at least one embodiment, the field management setup screen 301 enables authorized users to access the scheduled tasks, a list of clients, call reports, account details, billing details, billing history, message settings, such as SMS message settings, and payment gateway. In one or more embodiments, via the field management setup screen 301, authorized users may enable or disable a field agent connection button, such that enabling the field agent connection button allows the authorized users to track and monitor the client interaction between the at least one field agent 104 and the at least one client 103, and allows for all calls to be routed through the field management application 101 and VoIP phone server 102 via the plurality of selection methods.

As shown in FIG. 4, according to one or more embodiments, the field management setup screen 401 provides integration settings for the plurality of selection methods and the at least one client 103. In at least one embodiment, the field management setup screen 401 displays options for the authorized user including an option to select which client of the at least one client 103 to activate a service number for, an option to select a client' service phone number used from the at least one client 103, depending on the selection method enabled, an option to select the at least one client's 103 phone number, an option to enable advanced caller identification if enabling the third selection method, and an option to record the one or more calls. In at least one embodiment, enabling the caller identification provides an option to assigned a caller identification to be shown to the at least one client 103, wherein the identification may be shown as one or more of the at least one field agent's 104 actual identification name and number, a pre-selected default office number, a visual image of the at least one field agent 104 assigned to the task, a geographic location of wherein the task is to be performed and a geographic location of the at least one field agent 104 assigned to the task. In one or more embodiments, the field management setup screen 401 may also provide an option to create and display a prompt to the at least one client 103.

As shown in FIG. 5, according to one or more embodiments, the field management setup screen 501 provides an option to the authorized user to input a caller's number for the at least one field agent 104 and the at least one client 103 based on a service type and/or service area, such as based on any combination of a pre-defined type of task, pre-defined state, city, county and zip code. By way of at least one embodiment of the invention, via the field management setup screens 301/401/501, the service management application 101 may accept uploads of files, such as from the authorized users, to save and/or to link to the one or more scheduled tasks, to the one or more field agents 104 and/or to the one or more clients 103. In one or more embodiments, the uploaded file may include a sound file, such as an automated sound file, wherein the sound file is used to notify the one or more clients 103 that the conversation between the at least one client 103 and the at least one agent 104 is being or will be recorded.

Figure 6:
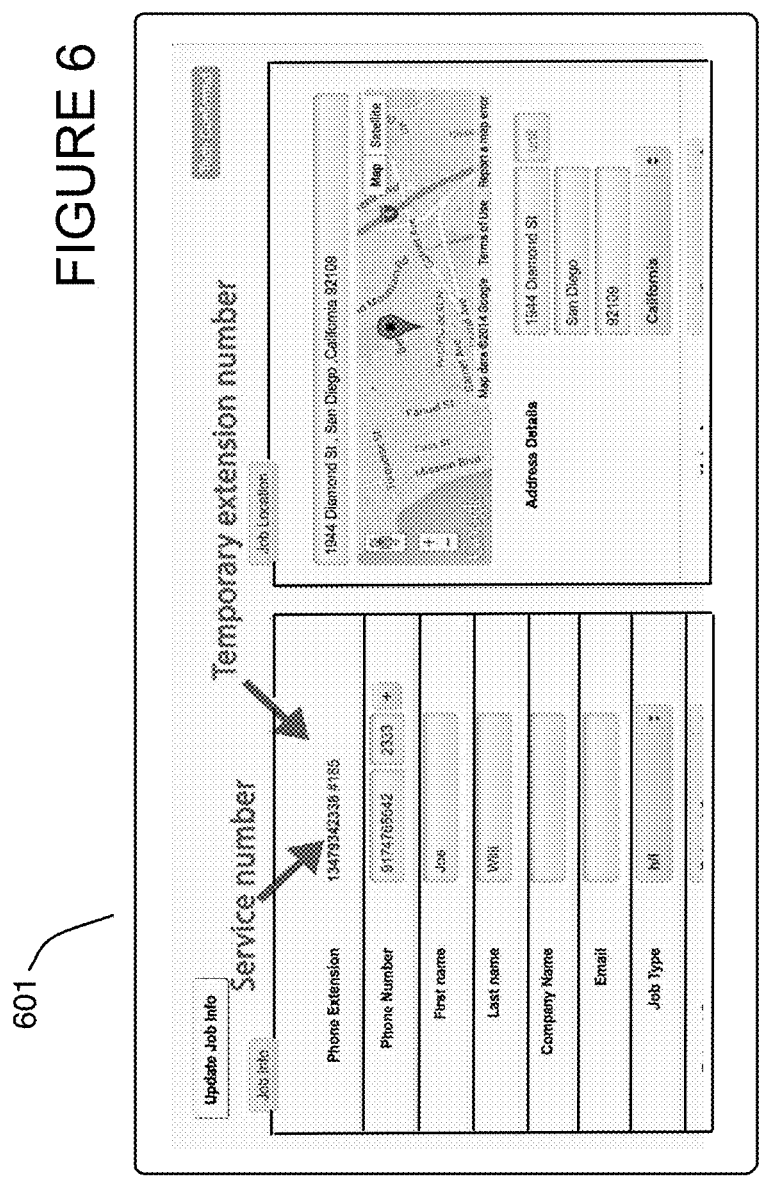
Figure 7:
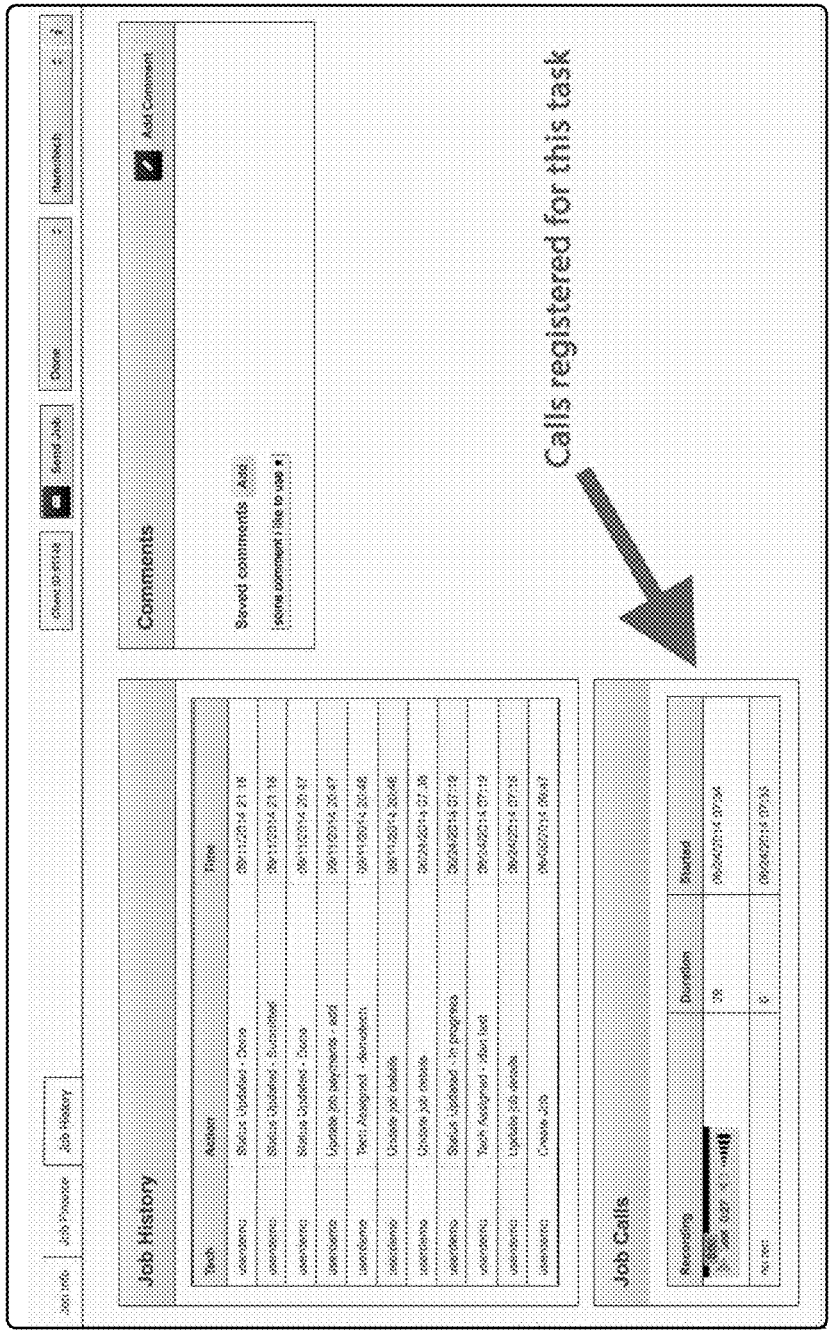
FIG. 7 is an exemplary interface of the field management application task management screen.

FIG. 6 and FIG. 7 are exemplary interfaces of the field management application task management screen, according to one or more embodiments of the invention. As shown in FIG. 6, in at least one embodiment, the task management screen 601 allows the authorized user to view information and details of the task to be scheduled, or that is scheduled, via a job info tab. In one or more embodiments, the scheduling task information may include one or more of the service phone number to be used, depending on the selection method of the plurality of selection methods, the temporary extension number if needed, the client's phone number, the client's first name, last name, company name and e-mail address, and the task job type to be performed. In at least one embodiment of the invention, the task management screen 601 may display a map of the client's address. In one or more embodiments, the task management screen 601 may display the at least one field agent's 104 location relative to the at least one client 103, and may display directions from the location of the at least one field agent 104 to the at least one client 103. As such, in at least one embodiment, the service management application 101 may monitor the location of the at least one field agent 104 and monitor the route the at least one field agent 104 took to reach the at least one client 103 in order to manage efficiency and performance by the at least one agent 104. In at least one embodiment, the service management application 101 may communicate with, track and monitor the at least one field agent 104 via a field agent mobile device or any other field agent computer.

As shown in FIG. 7, in one or more embodiments, the task management screen 701 may include the job info tab, a job finance tab and a job history tab. In at least one embodiment, via the job history tab, the task management screen 701 may display a job history update list, a job call recordings list and a comments box. According to one or more embodiments, the job history update list may include an information list including the technician or field agent's name, the action performed, and the date and time the action was performed.

In one or more embodiments of the invention, via the task management screen 701, the service management application may accept, log and store information associated with one or more calls generated by the at least one field agent 104 relevant to the at least one task. In at least one embodiment, the information may include one or more of a duration of the one or more calls and a time of the one or more calls. In at least one embodiment, via the task management screen 701, the service management application 101 may provide and display all communications between the at least one field agent 104 and the at least one client 103, with an option to play the one or more recordings. As shown in FIG. 7, in one or more embodiments, via the task management screen 701, the service management application 101 may one or more of display an option to record and save the one or more calls as one or more recordings, display an option to play the one or more recordings, display an option to send the one or more recordings, and calculate and display a response time and an average response time. In at least one embodiment, the response time includes a time from when the at least one task is dispatched to the at least one field agent 104 to when the one or more calls were generated by the field agent 104, as will be discussed further below regarding FIG. 9.

Figure 8:
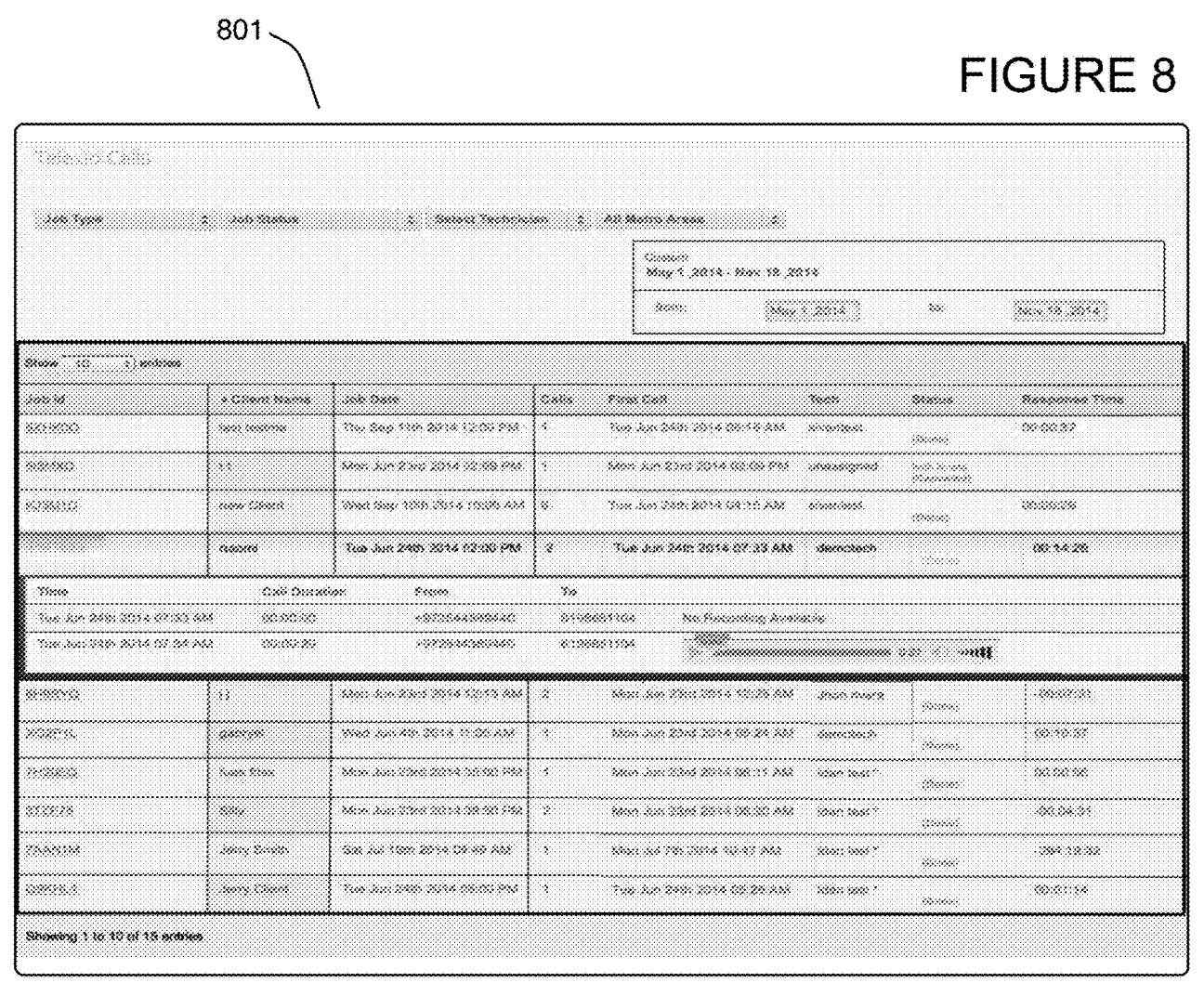

FIG. 8 is an exemplary interface of the field management application call reporting screen, according to one or more embodiments of the invention. In at least one embodiment of the invention, the service management application 101 may include a call reporting screen 801. In one or more embodiments, the call reporting screen 801 allows authorized users to retrieve data for the one or more calls, the one or more recordings, the schedules tasks and job history, and averages for all data. As shown in FIG. 8, in one or more embodiments, via the call reporting screen 801, the service management application 101 may display one or more job or task entries along with the job or task identification, the at least one client's name relative to the job identification, the job or task date relative to the job identification, and/or the number of calls conducted to and from relative to the job identification. In at least one embodiment, via the call reporting screen 801, the service management application 101 may display the time and date of a first call conducted relative to the job identification, the name of the at least one field agent 104, descriptive status of the job entry relative to the job identification, and the response time depicting a time from when the at least one task or job is dispatched to the at least one field agent 104 to when the one or more calls were generated by the field agent 104.

In one or more embodiments, as shown in FIG. 8, via the call reporting screen 801, the authorized user may select a custom date range and/or time frame within a specific day, such that the service management application 101 accepts such a selection and displays the one or more tasks and calls conducted within the selected time frame and/or date range. In one or more embodiments, via the call reporting screen 801, the service management application 101 may filter the one or more calls based one or more of the job identification, the client name, the number of calls conducted, the first call conducted, the at least one field agent 104, the descriptive status of the at least one task or of the job identification and the response time.

In one or more embodiments, via the call reporting screen 801, the service management application 101 may enable an authorized user to select one of the job entries by clicking on a selected job identification, wherein the job identifications may be in the form of a selectable link. In at least one embodiment, once a job identification is selected and clicked, the selected link open a window displaying the list of the one or more calls related to the job identification. In one or more embodiments, the list of the one or more calls may include one or more of the time and date of the one or more calls, the duration of the one or more calls, the phone number used to place the call and the phone number the call was made to. In one or more embodiments, the phone number used by the at least one field agent 104 depends on the selection method of the plurality of selection methods from the plurality of service phone numbers, as discussed above.

By way of at least one embodiment, the list of the one or more calls may provide details regarding one or more recordings related to each of the one or more calls of the selected job identification, indicating whether a recording is available or whether a recording is not available. In at least one embodiment, if a recording is available, an option is provided to play the recording and the duration of the recording is displayed. In one or more embodiments, via the call reporting screen 801, the service management application 101 may save, delete and/or send the one or more recordings. In at least one embodiment, via the call reporting screen 801, the service management application 101 may provide a detailed call report on each of the at least one task of each job identification. In one or more embodiments, the call report may include one or more of the duration of the one or more calls, the time of the one or more calls, the one or more recordings saved and the one or more recordings sent, or any other data or information available from the service management application 101.

According to one or more embodiments of the invention, when the one or more calls are forwarded to the contact phone number associated with the at least one client 103, the at least one client 103 may receive information about the at least one field agent 104. In at least one embodiment, the information may include one or more of a name associated with the at least one field agent 104, an identification number associated with the at least one field agent 104, an office number associated with the at least one field agent 104, a geographical location or address associated with the at least one field agent 104, and live updates of the location of the at least one field agent 104 relative to the client's address of where the task is to be performed.

FIG. 9 is an exemplary graph depicting the average call return time from calls generated by a field agent to a client, according to one or more embodiments of the invention. In one or more embodiments, via the task management screens 601/701 and/or the call reporting screen 801, the service management application 101 may calculate and display a response time and an average response time, depicting a time from when the at least one task is dispatched to the at least one field agent 104 to when the one or more calls were generated by the field agent 104. By way of at least one embodiment, the service management application 101 may calculate an average response time of the response time of all of the one or more calls generated by the at least one field agent 104 to the at least one client 103. In one or more embodiments, the average response time may be calculated based on one or more of the at least one field agent 104, an area of the at least one task, a date of the at least one task and a type of task of the at least one task.

As shown in FIG. 9, according to one or more embodiments, element 901 illustrates the calculated values of average call return time, or the average response time, based on the number of calls generated by the at least one field agent 104, and element 902 indicates an average response or call return time limit value. As such, in at least one embodiment of the invention, the service management application 101 may, manually via an authorized user or automatically, disable the dispatch or forward of any tasks to any field agent, of the one or more field agents 104, that has an average call return time of grater than the average response time limit value 902. In one or more embodiments, the service management application 101 may automatically monitor the at least one field agent 104 and the respective field agent's average response time, and provide an automated method of categorizing the at least one field agent 104 as efficient or inefficient and take necessary action therefrom.

It will be apparent to those skilled in the art that numerous modifications and variations of the described examples and embodiments are possible in light of the above teaching. The disclosed examples and embodiments are presented for purposes of illustration only. Other alternate embodiments may include some or all of the features disclosed herein. Therefore, it is the intent to cover all such modifications and alternate embodiments as may come within the true scope of this invention.

What is claimed is:

1. A voice over Internet Protocol (VoIP) relay integration management system comprising:
   a service management application configured to be executed on a computer, wherein said service management application comprises an application database, a field management setup screen, a task management screen and a call reporting screen;
      wherein said service management application is accessible by at least one authorized account user, and,
      wherein said service management application monitors and gathers data of at least one client;
         wherein said data comprises client interaction data between said at least one client and at least one field agent; and,
   a VoIP phone server comprising a phone service database;
      wherein said VoIP phone server communicates with said service management application via a network, and,
      wherein said phone service database comprises a plurality of service phone numbers;
   wherein, via said field management setup screen, said service management application accepts credentials from said at least one authorized account user;
      validates said credentials to authenticate ownership;
      accepts a selection of a method for service phones from said at least one authorized account user from a plurality of selection methods, wherein said plurality of selection methods comprise
         a first selection method comprising selecting a single phone number with a temporary extension number from said plurality of service phone numbers,
         a second selection method comprising selecting multiple phone numbers from said plurality of service phone numbers, and
         a third selection method comprising selecting at least one phone number assigned with a caller identification from said plurality of service phone numbers;
            wherein said single phone number, said multiple phone numbers and said at least one phone number assigned with a caller identification are assigned to and used by said at least one field agent to call said at least one client; and,
      enables or disables said selection per said at least one field agent; and,
   wherein, via said task management screen, said service management application
      accepts, stores and schedules at least one task configured to be dispatched to said at least one field agent,
         wherein said at least one task comprises a job identification, a project, a name, an address and a contact phone number associated with said at least one client,
      accepts, logs and stores information associated with one or more calls generated by said at least one field agent relevant to said at least one task, wherein said information comprises a duration of said one or more calls and a time of said one or more calls,
      displays an option to record and save said one or more calls as one or more recordings,
      displays an option to play said one or more recordings,
      displays an option to send said one or more recordings, and,
      displays a response time, wherein said response time comprises a time from when said at least one task is dispatched to said at least one field agent to when said one or more calls were generated by said at least one field agent.

2. The system of claim 1, wherein said service management application calculates an average response time of said response time of all of said one or more calls generated by said at least one field agent, wherein said average response time is calculated based on one or more of said at least one field agent, an area of said at least one task, a date of said at least one task and a type of task of said at least one task.

3. The system of claim 1, wherein via said call reporting screen, said service management application one or more of
   accepts a selected time frame and displays said one or more calls conducted within said selected time frame;
   filters said one or more calls based one or more of said job identification, said client name, a number of calls conducted, a first call conducted, said at least one field agent, a status of the at least one task or of the job identification and said response time;
   provides a call report on each of said at least one task, wherein said call report comprises one or more of said duration of said one or more calls, said time of said one or more calls, said one or more recordings saved and said one or more recordings sent; and,
   provides and displays an average response time of said response time of all of said one or more calls, wherein said average response time is displayed based on one or more of said at least one field agent, an area of said at least one task, a date of said at least one task and a type of task of said at least one task.

4. The system of claim 1, wherein when said first selection is enabled, said service management application generates a temporary extension number associated with said at least one task and assigns said temporary extension number to said at least one client, and wherein said VoIP phone server is synced with said temporary extension number,
   such that when said at least one field agent calls said at least one client said temporary extension number is used to forward calls from said at least one field agent to said contact phone number associated with said at least one client.

5. The system of claim 4, wherein said service management application dispatches said at least one task to said at least one field agent to enable said at least one field agent to call said at least one client associated with said at least one task,
   wherein said at least one field agent does not receive said contact phone number associated with said at least one client and only receives the assigned temporary extension number and the selected single phone number from said plurality of service phone numbers.

6. The system of claim 5, wherein when said at least one field agent calls said at least one client via said single phone number,
   said VoIP phone server prompts said at least one field agent to enter said temporary extension number,
   said service management application validates said temporary extension number with said single phone number, and
   when said temporary extension number is validated, said VoIP phone server forwards said call to said contact phone number associated with said at least one client, and,
   when said call is forwarded to said contact phone number associated with said at least one client,
      said service management application one or more of records and stores said call, and logs said information associated with said call, and
      said VoIP phone server one or more of records and stores said call in said phone service database, and logs said information associated with said call in said phone service database.

7. The system of claim 1, wherein when said second selection is enabled, said service management application assigns an available phone number from said multiple phone numbers to said at least one task, and wherein said VoIP phone server is synced with said assigned available phone number, such that said assigned available phone number is used to route calls from said at least one field agent to said contact phone number associated with said at least one client.

8. The system of claim 7, wherein said service management application dispatches said at least one task to said at least one field agent to enable said at least one field agent to call said at least one client associated with said at least one task,
   wherein said at least one field agent does not receive said contact phone number associated with said at least one client and only receives the assigned available phone number from said multiple phone numbers from said plurality of service phone numbers.

9. The system of claim 8, wherein when said at least one field agent calls said at least one client via said assigned available phone number,
   said VoIP phone server forwards said call to said contact phone number associated with said at least one client, and,
   when said call is forwarded to said contact phone number associated with said at least one client,
      said service management application one or more of records and stores said call, and logs said information associated with said call, and
      said VoIP phone server one or more of records and stores said call in said phone service database, and logs said information associated with said call in said phone service database.

10. The system of claim 1, wherein when said third selection is enabled, said service management application
   assigns phone numbers with caller identifications from said at least one phone number assigned with a caller identification to each of said at least one task associated with said at least one client,
   saves said phone numbers assigned with caller identifications in said application database, and
   identifies which phone number assigned with said caller identification from said saved phone numbers said at least one client will use to receive a call from said at least one field agent, and enables said at least one client to call said at least one agent via said identified phone number.

11. The system of claim 10, wherein said service management application
   dispatches said at least one task to said at least one field agent to enable said at least one field agent to call said at least one client associated with said at least one task,
   communicates the identified phone number with said caller identification from said saved phone numbers to said at least one field agent, indicating a number the at least one field agent will be making one or more calls with to the at least one client,
      wherein said at least one field agent does not receive said contact phone number associated with said at least one client and only receives said assigned phone number selected from the saved phone numbers assigned with caller identifications.

12. The system of claim 11, wherein when said at least one field agent calls said at least one client via said assigned phone number selected from the saved phone numbers assigned with caller identifications, said service management application
   identifies said phone number used by said at least one field,
   cross-references said phone number used by said at least one field agent with said phone numbers saved in said application database,
   finds a match between said phone number used by said at least one field agent and said phone numbers saved in said application database,
   identifies the at least one task assigned to said at least one field agent with said phone number,
   integrates said VoIP phone server, such that said VoIP phone server forwards said call to said contact phone number associated with said at least one client, and,
   when said call is forwarded to said contact phone number associated with said at least one client,
      said service management application one or more of records and stores said call, and logs said information associated with said call, and,
      said VoIP phone server one or more of records and stores said call in said phone service database, and logs said information associated with said call in said phone service database.

13. The system of claim 12, wherein when said call is forwarded to said contact phone number associated with said at least one client, said at least one client receives information about said at least one field agent, wherein said information comprises one or more of a name associated with said at least one field agent, an identification number associated with said at least one field agent, an office number associated with said at least one field agent, and a geographical location associated with said at least one field agent.

14. A voice over Internet Protocol (VoIP) relay integration management system comprising:
   a service management application configured to be executed on a computer, wherein said service management application comprises an application database, a field management setup screen, a task management screen and a call reporting screen;
      wherein said service management application is accessible by at least one authorized account user, and,
      wherein said service management application monitors and gathers data of at least one client;

wherein said data comprises client interaction data between said at least one client and at least one field agent; and, a VoIP phone server comprising a phone service database; wherein said VoIP phone server communicates with said service management application via a network, and, wherein said phone service database comprises a plurality of service phone numbers;

wherein, via said field management setup screen, said service management application accepts credentials from said at least one authorized account user;

validates said credentials to authenticate ownership;

accepts a selection of a method for service phones from said at least one authorized account user from a plurality of selection methods, wherein said plurality of selection methods comprise
- a first selection method comprising selecting a single phone number with a temporary extension number from said plurality of service phone numbers,
- a second selection method comprising selecting multiple phone numbers from said plurality of service phone numbers, and
- a third selection method comprising selecting at least one phone number assigned with a caller identification from said plurality of service phone numbers;
  wherein said single phone number, said multiple phone numbers and said at least one phone number assigned with a caller identification are assigned to and used by said at least one field agent to call said at least one client; and, enables or disables said selection per said at least one field agent; and, wherein, via said task management screen, said service management application accepts, stores and schedules at least one task configured to be dispatched to said at least one field agent, wherein said at least one task comprises a job identification, a project, a name, an address and a contact phone number associated with said at least one client; and, accepts, logs and stores information associated with one or more calls generated by said at least one field agent relevant to said at least one task, wherein said information comprises a duration of said one or more calls and a time of said one or more calls, displays an option to record and save said one or more calls as one or more recordings, displays an option to play said one or more recordings, displays an option to send said one or more recordings, and, displays a response time, wherein said response time comprises a time from when said at least one task is dispatched to said at least one field agent to when said one or more calls were generated by said at least one field agent;

wherein said service management application calculates an average response time of said response time of all of said one or more calls generated by said at least one field agent, wherein said average response time is calculated based on one or more of said at least one field agent, an area of said at least one task, a date of said at least one task and a type of task of said at least one task; and, wherein via said call reporting screen, said service management application one or more of accepts a selected time frame and displays said one or more calls conducted within said selected time frame;

filters said one or more calls based one or more of said job identification, said client name, a number of calls conducted, a first call conducted, said at least one field agent, a status of the at least one task or of the job identification and said response time;

provides a call report on each of said at least one task, wherein said call report comprises one or more of said duration of said one or more calls, said time of said one or more calls, said one or more recordings saved and said one or more recordings sent; and, provides and displays said average response time of all of said one or more calls, wherein said average response time is displayed based on one or more of said at least one field agent, an area of said at least one task, a date of said at least one task and a type of task of said at least one task.

* * * * *